(12) United States Patent
Cumpson (10) Patent No.: US 7,246,513 B2
(45) Date of Patent: Jul. 24, 2007

(54) LATERAL CALIBRATION DEVICE AND METHOD

(75) Inventor: Peter J. Cumpson, Teddington (GB)

(73) Assignee: The Secretary of State for Trade and Industry of Her Majesty's Britannic Government, London (GB)

(*) Notice: Subject to any disclaimer, the term of this patent is extended or adjusted under 35 U.S.C. 154(b) by 0 days.

(21) Appl. No.: 11/259,642

(22) Filed: Oct. 25, 2005

(65) Prior Publication Data
US 2006/0101895 A1 May 18, 2006

(30) Foreign Application Priority Data
Oct. 26, 2004 (GB) ................... 0423780.6

(51) Int. Cl.
*G01P 21/00* (2006.01)
(52) U.S. Cl. .................................. 73/1.79
(58) Field of Classification Search ............ 73/1.79
See application file for complete search history.

(56) References Cited

U.S. PATENT DOCUMENTS 5,445,006 A * 8/1995 Allen et al. ................. 73/1.38
5,553,487 A   9/1996 Elings
6,796,180 B2 * 9/2004 Katsumata ............... 73/504.14
2002/0083757 A1 * 7/2002 Geen ........................ 73/1.37
2002/0117611 A1  8/2002 Kley
2003/0200785 A1 * 10/2003 Platt ......................... 73/1.37
2005/0241364 A1 * 11/2005 Fujiyoshi et al. ........... 73/1.79
2006/0005603 A1 * 1/2006 Chau et al. ................ 73/1.38

FOREIGN PATENT DOCUMENTS

GB     2 401 945 A      11/2004
WO    WO-2004/104516 A2  12/2004

* cited by examiner

*Primary Examiner*—Robert Raevis
(74) *Attorney, Agent, or Firm*—Darby & Darby (57) ABSTRACT

A calibration device and method for lateral force calibration in small force measuring devices such as atomic force microscopes is disclosed. A platform has a substantially planar surface including a slot for accommodating at least part of the AFM cantilever tip, one or more supporting legs arranged to provide sprung resistance to the platform and a capacitive drive means for driving the platform laterally with respect to the AFM cantilever tip.

12 Claims, 8 Drawing Sheets

LATERAL CALIBRATION DEVICE AND METHOD

FIELD OF THE INVENTION

The present invention relates to a calibration device and methods suitable for lateral forces in calibrating small force measuring devices. In particular, the present invention relates to a lateral calibration device and methods in which accurate measurements under, and traceable to standards such as the SI system can be obtained.

BACKGROUND OF THE INVENTION

Measurements of small forces, in the nanonewton and piconewton range, have become important in recent years due to the widespread use of the Atomic Force Microscope (AFM) and associated instruments. There is a need to measure such small forces accurately, for example, protein-protein interactions or materials properties via the small force applied to an indenting tip.

The quantification of interaction forces is much more problematic. Force on the tip is inferred from the deflection of the cantilever, using an assumed value for the cantilever spring constant. The accuracy to which the spring constant is known is the limiting factor in the accuracy of a force measurement. Many methods have been proposed for calibrating the stiffness of an AFM probe, but none are traceable, and typical accuracy is only about 20-30%.

Reference artifacts for dimensional calibration of AFM have been available from many sources for ten years or more, but calibration of the force constant of AFM cantilevers is more troublesome. Uncalibrated cantilevers lead to very large errors in the measurement of nanonewton forces, such as in direct experiments to break individual covalent bonds by AFM, or the measurement of protein interaction forces. Commercial reference artifacts are available, but offer no traceability to the SI measurement system. This is important because there are two important methods of measuring nanoscale forces, AFM and optical tweezers. AFM is most conveniently calibrated using reference cantilevers, whereas optical tweezer forces are estimated based on the rate of change of photon momentum. Both methods are used, for example, in measuring bond-breaking forces. They must both have a common force scale, or burgeoning work in both areas will be difficult to build-upon. What is more, a traceable calibration method is now timely.

AFMs measure topography accurately, and are calibrated for this purpose quite easily using step-height standards. Some AFM instruments even incorporate laser interferometry to make traceable height measurements. However accuracy is rarely mentioned for AFM force measurements. There is an increasing need for the accurate measurement of small lateral forces by AFM, in the mechanical analysis of contamination on semiconductor surfaces, polymer blends, functional thin films, recording media and measuring adhesion of nanoparticulates at surfaces. The lateral force signal is useful for identifying surface composition where the materials are relatively flat but have significantly different friction characteristics. When combined with the use of chemically functionalised AFM tips, lateral force imaging can reveal contrast between different surface species where none can be seen in any other scanned probe mode. Many existing and future applications use the lateral force signal only to provide image contrast, but in many other applications the quantitative comparison of lateral force measurements is essential. This has been difficult so far, due to the wide range of torsional constants seen in even supposedly similar cantilevers. Cantilever coatings, to improve reflectivity, or chemically functionalise the tip, can have a significant effect on spring and torsional constants that are difficult to model. A calibration method is required.

A wide variety of methods have been used to calibrate normal spring constant, including thermal vibrations, reference cantilevers of measured dimensions, and radiation pressure. Commonly assigned co-pending patent application No. PCT/GB2004/002134, which is herein incorporated by reference discloses a MEMS device designed for the calibration of normal forces in AFMs, allowing piconewton and nanonewton force measurements to be made traceable to the SI system. However, calibration of lateral forces is more of a problem. Thermal vibrations can be useful, but there are fewer other options. Many of the methods that have been tried for the purpose of normal force calibration have extensions to allow the calibration of lateral forces, but some have no obvious method of being extended in this way, and are likely to be limited to the calibration of normal forces only. Those existing methods able to measure the torsional constant typically require accurate dimensional measurements (e.g. in an SEM) or high frequency power spectrum measurement that is beyond the bandwidth of the signal amplifiers supplied as part of the AFM electronics. In other words, these methods require additional facilities the AFM user may not have access to, and even if available, requires special training to achieve the accuracy needed.

STATEMENT OF INVENTION

According to an aspect of the present invention, there is provided a calibration device for lateral calibration of a small force measuring device's tip comprising a platform having a substantially planar surface including a slot for accommodating at least part of the tip, one or more supporting legs arranged to provide sprung resistance to the platform and a capacitive drive means for driving the platform laterally with respect to the tip to enable measurement of a torsional constant for said small force measuring device.

The capacitive drive means may include one or more interdigital comb drive capacitive actuators. The capacitive drive means may include a Watt Balance device.

The calibration device may further comprising imaging means for enabling optical access to the calibration device when in use. The imaging means may include an optical prism and/or one or more mirrors.

The slot may include one or more substantially tapered sides.

The small force measuring device preferably includes an atomic force microscope.

The calibration device is preferably a micro-electro-mechanical system (MEMS). The calibration device is preferably a silicon-on-insulator micro-machined device.

The calibration device may be fabricated on a die including one or more other calibration devices.

According to another aspect of the present invention, there is provided a calibration method for determining the torsional constant of a small force measuring device comprising:

providing a calibration device comprising a platform having a substantially planar surface including a slot for accommodating at least part of the tip, one or more supporting legs arranged to provide sprung resistance to the platform and a capacitive drive means for driving the platform laterally with respect to the tip;

placing the tip of said small force measuring device in contact with at least one side of the slot of the platform of the calibration device;

measuring lateral force applied to said at least one side using the capacitive drive means; and, dividing the lateral spring constant of the calibration device by the measured lateral force.

The method may further comprise obtaining the lateral spring constant of the calibration device.

The method may further comprise performing said calibration after use of the small force measuring device.

According to another aspect of the present invention, there is provided a method of determining the spring constant of a calibration device comprising:

providing a calibration device comprising a platform having a substantially planar surface including a slot for accommodating at least part of the tip, one or more supporting legs arranged to provide sprung resistance to the platform and a capacitive drive means for driving the platform laterally with respect to the tip;

measuring equilibrium lateral displacement of the calibration device as a function of applied voltage;

measuring current to earth passing through the calibration device whilst substantially simultaneously measuring vibration velocity;

measuring the spring constant of the one or more supporting legs; and, calculating the spring constant in dependence on the measurements.

The step of measuring current to earth passing through the calibration device whilst substantially simultaneously measuring vibration velocity may include:

applying a predetermined vibration to the calibration device and simultaneously measuring the velocity of the platform; and, calculating the gradient of capacitance of the calibration device in dependence on the measured velocity.

The step of measuring equilibrium lateral displacement of the calibration device as a function of applied voltage may include:

applying a predetermined voltage to the capacitive drive means and simultaneously measuring the static displacement of the platform.

Measurement of the static displacement may use white-light interferometry.

Measurement of the velocity may use Doppler velocimetry.

Embodiments of the present invention are directed to a microfabricated device for the calibration of torsional spring constant, potentially traceable to SI standards. This will be particularly useful in the measurement of small frictional forces with near nanometer resolution.

Lateral force comparisons can be performed easily in the user's AFM, with a precision of better than ±5%.

For those AFM tips that have been chemically functionalised, the calibration is best performed retrospectively, after any experimental measurements that may depend on tip functionalisation.

Calibration of lateral force microscopy (LFM) cantilevers is necessary for the measurement of nanonewton and piconewton frictional forces, which are critical to analytical applications of polymer surfaces, biological structures and organic molecules at nanoscale lateral resolution.

In an embodiment of the present invention, a compact and easy-to-use reference calibration device is used for calibration.

The calibration device allows measurements to be made that are traceable to the SI standards.

A non-contact method enables measurement of the spring constant of these calibration devices, by a combination of electrical measurements and Doppler velocimetry. Traceability is important to ensure that force measurements by AFM are comparable to those made by optical tweezers and other methods.

In preferred embodiments, the calibration device is a MEMS device fabricated by silicon-on-insulator (SOI) micromachining, and therefore has extremely low mass and good immunity to vibration.

In an embodiment of the present invention, a method of calibrating the torsional constant of an AFM cantilever using a calibration device is disclosed. Importantly, the method requires no special equipment beyond the calibration device and that already present in the majority of AFM instruments, and familiar to the AFM practitioner.

BRIEF DESCRIPTION OF THE DRAWINGS

Embodiments of the present invention will now be described in detail, by way of example only, with reference to the accompanying drawings in which.

DETAILED DESCRIPTION

Figure 1:
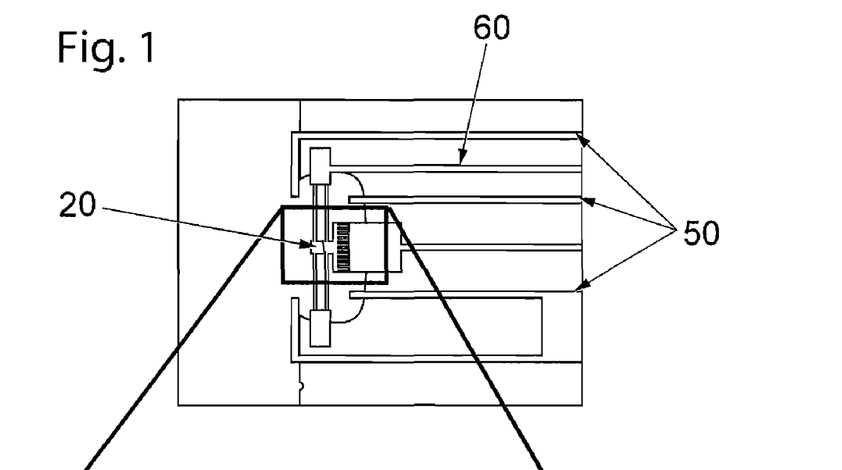
FIG. 1 is an optical micrograph of a calibration device according to an embodiment of the present invention.
Figure 1A:
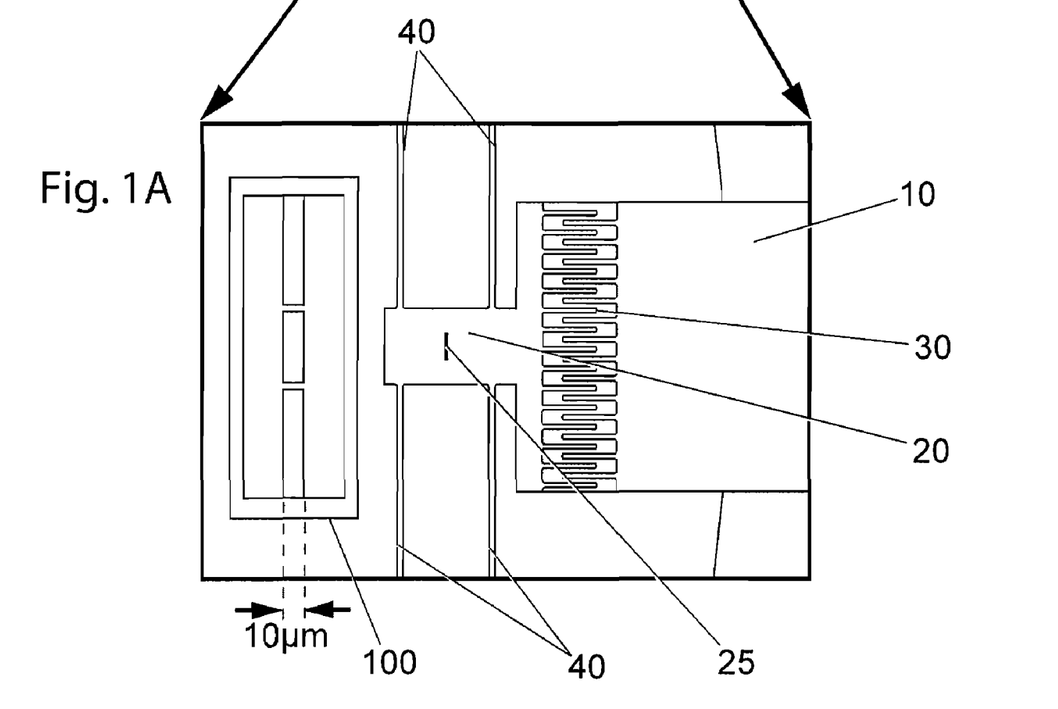
FIG. 1A is a detail view of the platform 20 and the surrounding elements that appear in the boxed portion of FIG. 1.

FIG. 1 is an optical micrograph of a calibration device 10 according to an embodiment of the present invention. The inset 100 shows a cross section of the device 100. See FIG. 1A.

The calibration device 10 includes a gold-coated silicon platform 20 suspended on supporting legs, in this embodiment in the form of four cantilever beams 40. A capacitive drive means in the form of an electrostatic comb drive 30 allows the platform 20 to be moved laterally by the application of an electrical potential. Etched into the platform 20 is a slot 25 of width 3 µm, which an AFM tip will at least partially enter if scanned across the surface of the platform 20. The calibration device 10 is preferably fabricated from a single crystal "silicon on insulator" (SOJ) layer of nominal thickness 101±µm. This is patterned from the front by deep reactive ion etching (DRIE) leading to almost vertical side walls. A 400 µm thick silicon handling wafer is separated from the SOI structural layer by a 1 µm insulating oxide layer.

The handling wafer was etched from the back side (i.e. the opposite side to the SOI layer) to completely remove a section of it below the resonator, while retaining enough mechanical robustness to allow electrical connections to be made on the front side by conventional gold wirebonding.

Calibration of the Calibration Device

Figure 2A:
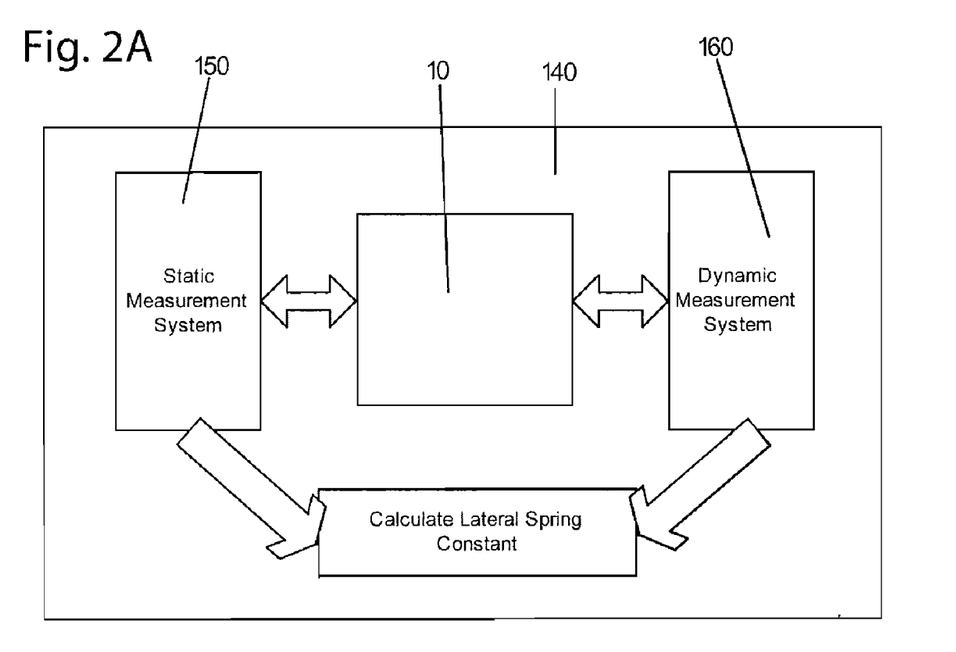
FIG. 2a is a block diagram illustrating a calibration system according to an embodiment of the present invention.

The calibration device 10 realises a known nanonewton force in terms of traceable measurements of electrical quantities and linear displacement and velocity. A calibration system 140 according to an embodiment of the present invention uses two measurement systems. as illustrated in FIG. 2a.

1. Static measurement system 150. This consists of measuring the equilibrium lateral displacement of the calibration device 10 as a function of applied voltage. We measure this static displacement using white-light interferometry using a Zygo NewView 5020 interferometer (Zygo Corporation, Middlefield, Conn. 06455-0448, USA). The DRIE etched face of the calibration device 10 is sufficiently perpendicular to the plane of motion for optical fringes to be located and measured, allowing accurate measurement of static displacement.

2. Dynamic measurement system 160, illustrated schematically in FIG. 2b. This consists of measuring the current to earth passing through the device, while simultaneously measuring its instantaneous vibration velocity using Doppler velocimetry (also known as Doppler vibrometry). The extremely sharp resonance of the calibration device, even when operating in air, allows us to separate the change in capacitance of the device due to mechanical displacement from the inevitable parasitic capacitances elsewhere in the circuit.

Figure 2B:
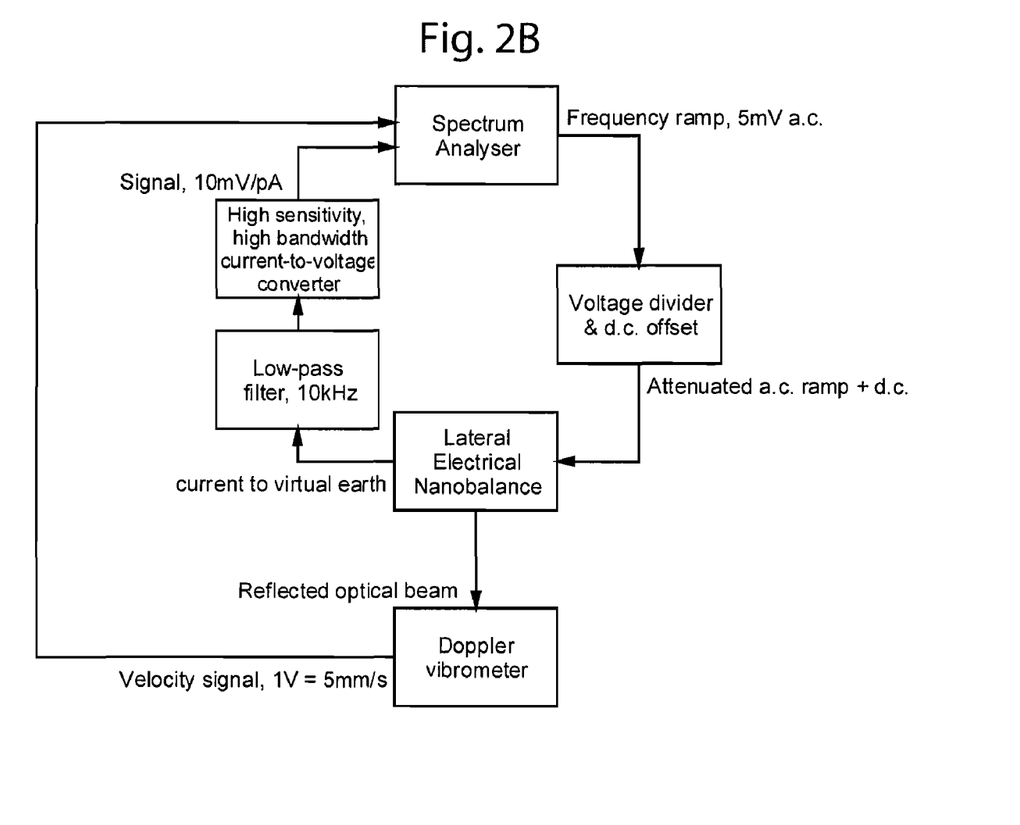
FIG. 2b is a block diagram showing how the dynamic component spring constant of the calibration device of FIG. 1 is measured.

The velocity of the calibration device 10 was measured, edge-on, using a Polytec OPV 1 Doppler velocimeter (Polytec GmbH, Waldbronn, Germany), and this signal recorded using a HP 3562A Dynamic Signal Analyser (Agilent Technologies, Palo Alto, Calif.). These data were downloaded from the Dynamic Signal Analyser to a personal computer. Current through the calibration device 10 was measured using a CyberAmp 320 Signal conditioner with type 403 preamplifier (Molecular Devices Corporation, Union City, Calif.). By using it in "virtual-earth" configuration, any parasitic capacitance across the input of the amplifier (or between the moving part of the actuator and the die substrate) connects virtual earth 60 to earth, so its influence on the circuit operation is insignificant. In addition, the signal path from the calibration device 10 was carefully surrounded on the printed circuit board (PCB) by an earthed "guard" track 50, to minimize the effect of small stray currents across the bare PCB surface, for example due to any small surface contamination by electrolytes.

We measure the spring constant of the four supporting cantilever beams 40 by a method described in detail in co-pending commonly assigned patent application Ser. No. PCT/GB2004/002134, which is hereby incorporated by reference in its entirety. The current through the comb drive 30, for a potential $V_p$ applied to it is given by;

$$i = \frac{d(CV_p)}{dt}. \tag{1}$$

We separate the capacitance of the calibration device 10 into two parts; the dynamic capacitance, C(x), which changes as the platform 20 is displaced laterally parallel to the x axis, and the static or parasitic part, $C_{para}$, the capacitance between fixed parts of the calibration device 10, for (example adjacent tracks and pads on the silicon die). If we measure the response of the calibration device 10 over a narrow frequency interval around the mechanical resonance, we expect the static capacitance to be constant, but the dynamic capacitance will vary with the motion of the platform. We apply a d.c. potential of $V_0$ to the stationary part of the comb drives 30, together with a small a.c. component v(t), so that $$V_p(t) = V_0 + v(t). \tag{2}$$

The purpose of the small a.c. component is to apply a small drive to the calibration device 10, which, if this drive voltage is close to its mechanical resonant frequency, will cause it to vibrate mechanically with significant amplitude. Typically $V_0$ is chosen in the range 0.5 to 2V, and v(t) is a sinusoid of amplitude chosen in the range 100 µV to 1 mV peak-to-peak.

$$v(t) = v_0 \cos(\omega t) \tag{3}$$

The velocity of the platform is measured by Doppler velocimetry, in a configuration illustrated schematically in FIG. 2b. For a particular bias voltage $V_0$, and an a.c. component amplitude $v_0$ sufficiently small, the capacitance C(x) varies linearly over the range of mechanical vibration. The lateral motion of the comb drive 30 makes it easy to fulfill this condition of linearity for larger amplitudes than possible with the normal force calibration device described in PCT/GB2004/002134, where the comb drives are operated in levitation mode.

The static deflection of the platform 20 is the result of the balance between the elastic restoring force applied by the cantilever beams 40 and the electrostatic force from the comb-drives 30. The stored electrostatic field energy is $$E = \frac{1}{2} C V_p^2 \tag{4}$$

so that the electrostatic force is $$F_{elec} = \frac{1}{2} \frac{\partial C}{\partial x} V_p^2 \tag{5}$$

which balances an elastic force of;

$$F_{elastic} = k_x \bar{x} \tag{6}$$

where $\bar{x}$ is the measured static deflection. We equate the forces $F_{elastic} = F_{elec}$ in Eqns (5) and (6), and obtain the measured capacitance gradient $\partial C/\partial x$ from the dynamic measurements illustrated in FIG. 2. This allows us to determine the lateral spring constant $k_x$.

Figure 3:
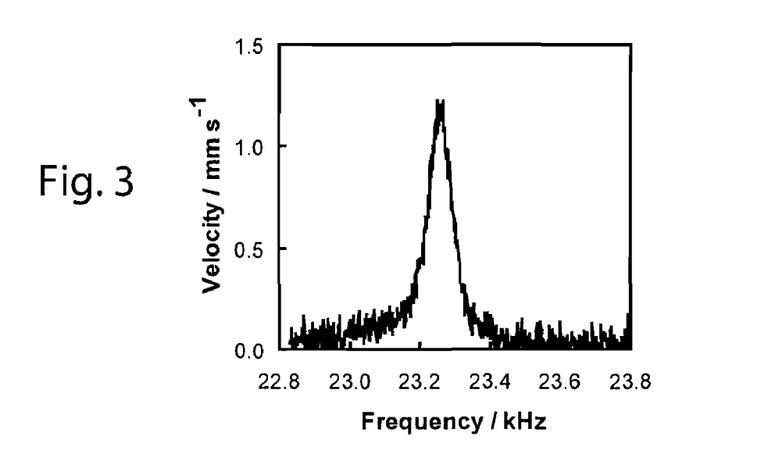
FIG. 3 is a graph illustrating fundamental mechanical resonance of the calibration device of FIG. 1 in air at atmospheric pressure, measured by Doppler velocimetry.

Note that the fact that, the dynamic measurements are made while the calibration device 10 resonates in a lateral mode means it has a much higher quality factor in air (Q≈230, as shown in FIG. 3. This indicates a resonance quality factor of around 230, high enough to allow calibration in air) than the calibration device disclosed in PCT/GB2004/002134, which presented a much greater cross-section. Therefore the static and dynamic steps of the calibration can both be carried out in air.

AFM Cantilever Calibration

Figure 4:
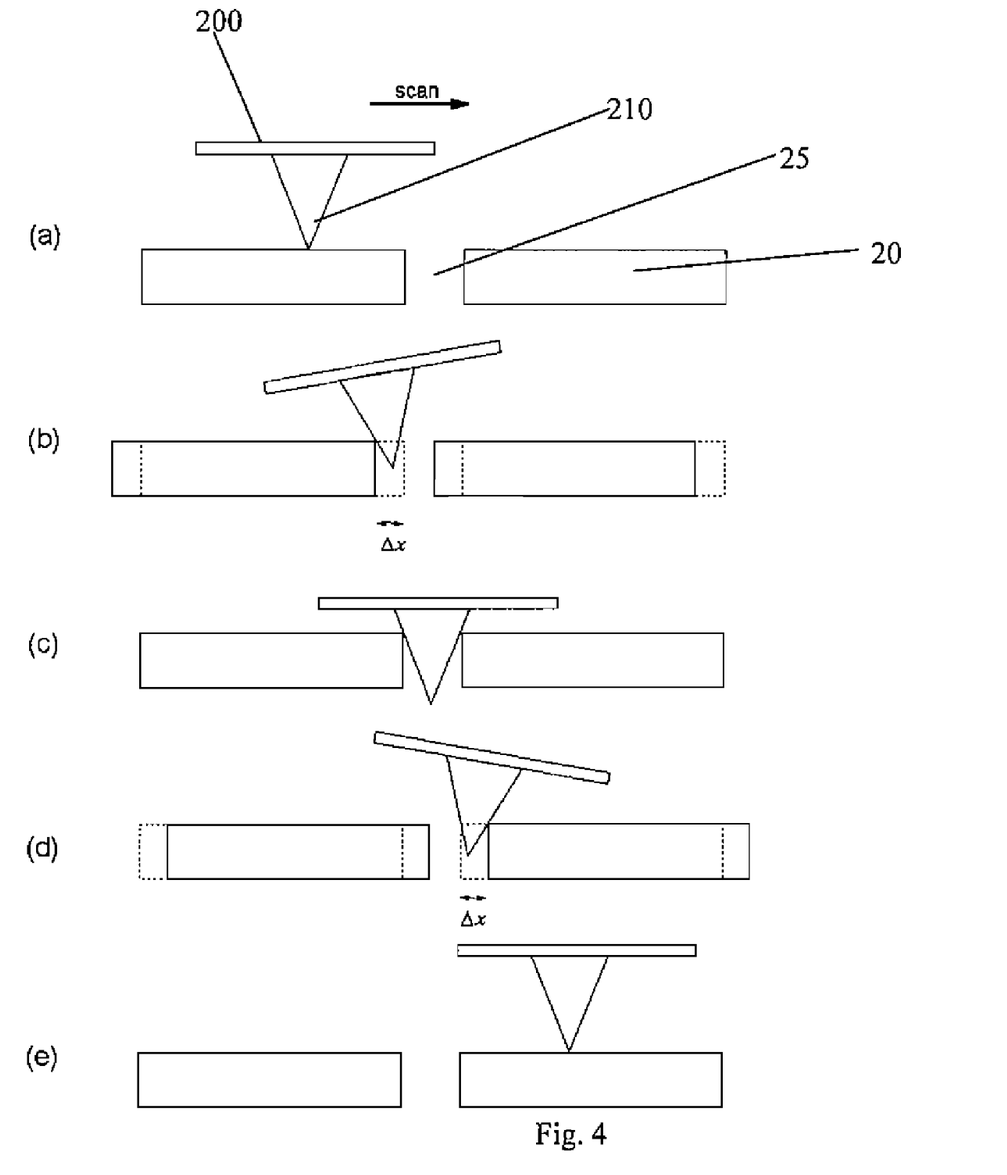
FIG. 4 is a diagram illustrating lateral force calibration by "Continuous Contact" (CC) using the calibration device of FIG. 1.
Figure 5:
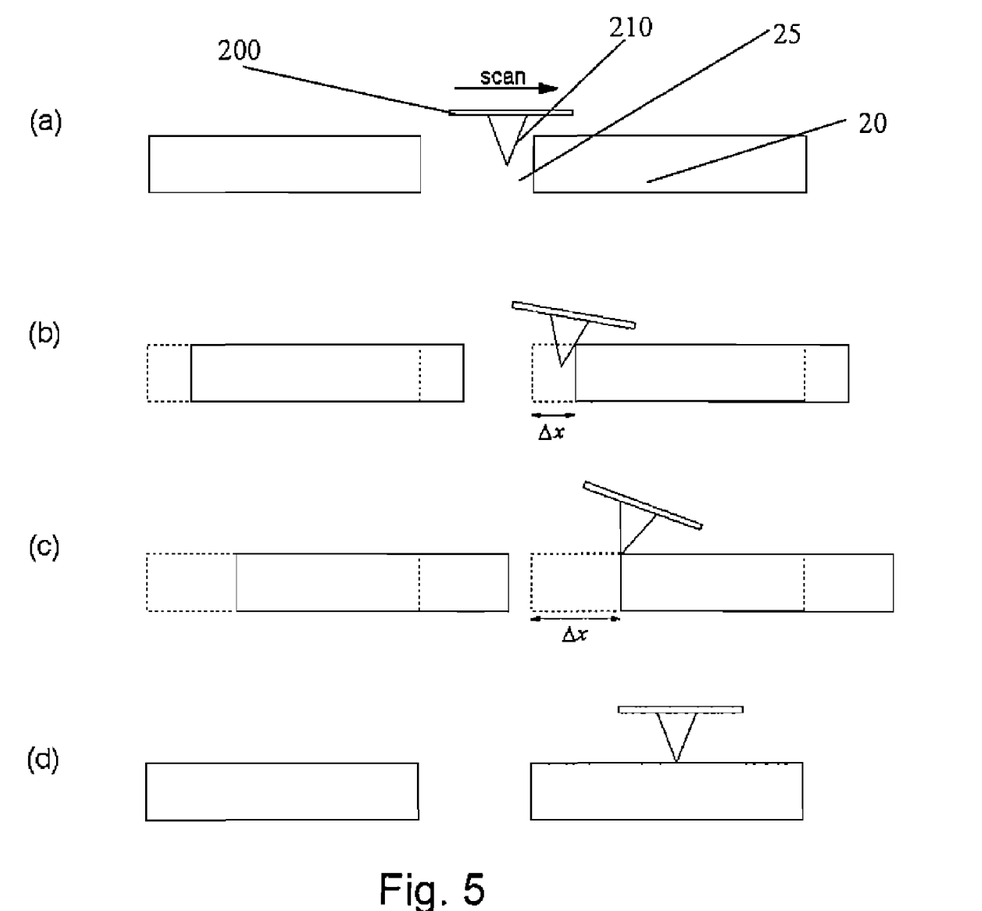
FIG. 5 is a diagram illustrating the sequence of events during "Non Continuous Contact" (NCC) lateral force calibration of an AFM cantilever.

Calibration of the torsional constant of an AFM cantilever 200 against a calibration device according to an embodiment of the present invention is illustrated in FIGS. 4 and 5. An imaging scan of the surface of the calibration device 10 is performed, centered on the slot 25. Depending on the dimensions of the tip 210 of the cantilever 200 compared to the width of the slot 25, and the setpoint for AFM topography feedback, two types of lateral force curve may be observed, both of which allow an AFM cantilever 200 to be calibrated.

(a) Continuous contact ("CC"), in which the tip 210 is in contact with the calibration device 10 at all times, and (b) Non-continuous contact ("NCC"), in which the tip 210 breaks contact with the calibration device 10 for some distance while the tip 210 is inside the slot 25.

FIGS. 4 and 5 show schematic cross-sections of the path of the scanning tip in CC and NCC cases respectively.

We can balance the forces on the AFM tip at the point in the scan illustrated in FIG. 5 stage (c) (this point is also a feature of in continuous contact in FIG. 4, between the illustrated stages (d) and (e)). At this point in the scan the very tip 210 of the AFM cantilever 200 is in contact with the corner of the slot 25 in the platform 20 of the calibration device 10, so that the lateral force on the tip 210 is just the product of the lateral displacement of the calibration device 10 and its lateral spring constant, $k_x$, described above. Thus $$F_x = k_x \Delta x = s V_{L-R} \quad (7)$$

where $F_x$ is the lateral force on the tip, $\Delta x$ is the lateral displacement of the calibration device 10 caused by the contact with the AFM tip 210, $V_{L-R}$ is the "left-minus-right" signal from the split photodiode, and s is the torsional spring constant that we need to measure for this AFM cantilever 100. We have assumed a linear relationship, which is true of almost all AFM instruments over a certain range of deflection of the optical lever. In many instruments this range is very wide, and this linear relationship reliable. In other designs of AFM instrument, perhaps through design optimization for imaging of topography at a single setpoint rather than force measurement, the range over which linearity can be assumed is small. Rearranging and differentiating we obtain, $$s = k_x \left( \frac{\partial V_{L-R}}{\partial x} \right)^{-1}. \quad (8)$$

Therefore the torsional constant of the cantilever 200 is simply the known lateral spring constant of the calibration device 10, divided by the slope of the lateral force signal when scanning perpendicular to the slot 25, at the point illustrated in FIG. 5 stage (c).

Figure 6:
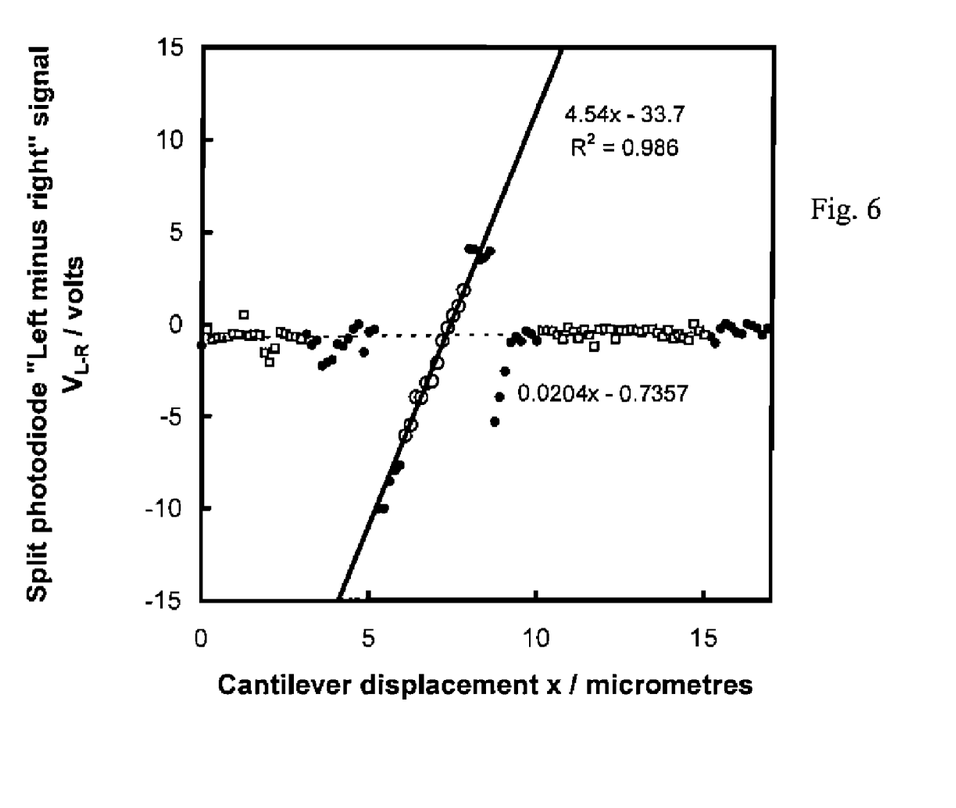
FIG. 6 is a graph of a measured lateral force signal for Continuous Contact (CC) lateral force calibration of an AFM cantilever.

Since $k_x$ is known, s is easily evaluated. FIG. 6 shows experimental results from a Park Autoprobe CP Atomic Force Microscope with a cantilever 200 of nominal normal spring constant 30 N/m quoted by the cantilever supplier. In this case the lateral force signal varies linearly over the region in which the AFM tip 210 lies within the slot 25, so that we can perform a linear fit to this region, giving in this particular case;

$$\left( \frac{\partial V_{L-R}}{\partial x} \right) = 4520 \pm 210 \, V/m \quad (9)$$

This value, substituted into Eq. (8), then gives us the torsional constant of the cantilever 200.

Figure 7:
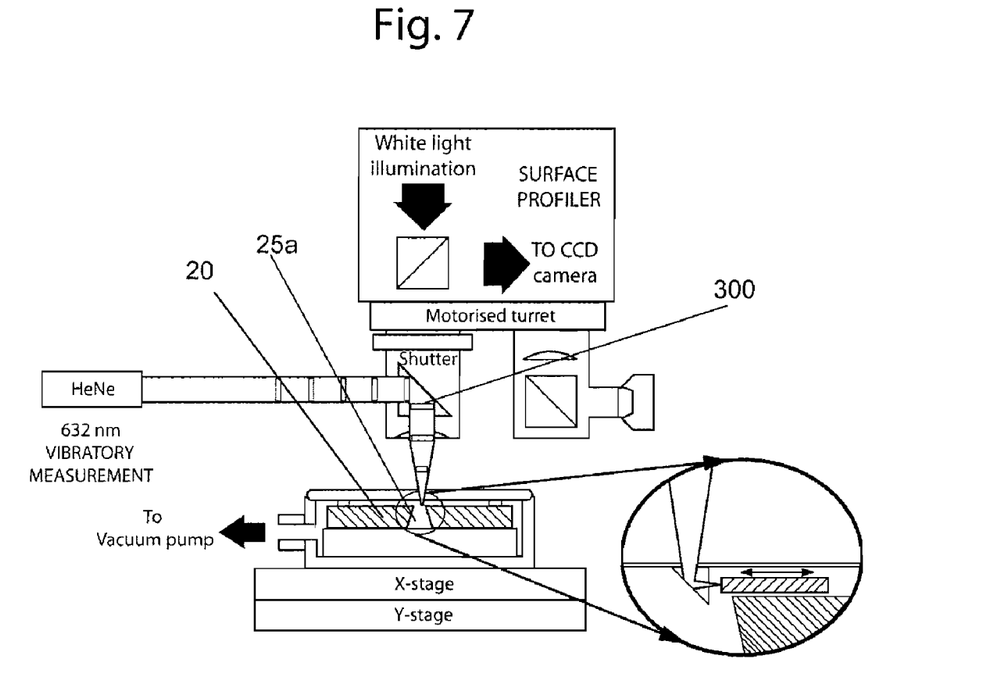
FIG. 7 is a schematic diagram of an arrangement for AFM lateral force calibration according to an embodiment of the present invention; and, FIGS. 8 and 9 are views of an arrangement for AFM lateral force calibration according to another embodiment of the present invention.

Clearly however, we should not expect that all possible tip profiles give rise to a linear lateral force signal. In particular, if the aspect ratio of the tip 210 is high, while the slot width is large, the lateral force applied to the AFM tip 210 by the calibration device 10 in FIG. 5 (c) is further from the torsional axis of the cantilever 200 than in (b), and hence we would expect a larger gradient at point (c). We have seen this nonlinearity experimentally for some cantilevers 200. Two approaches are likely to be useful in these cases;

(i) Fitting an analytical model to the lateral force signal that takes account of the height of the tip (i.e. the "top-minus-bottom" signal from the split photodiode) so as to account for the increasing couple applied to the tip as it rises out of the slot 25 in the calibration device 10, and (ii) Use of a calibration device 10 having a tapered slot 25a (as is shown in FIG. 7), so that in a raster scan image of the surface of the platform 20 one can always find a linescan in which the tip penetration into the slot 25a is very small, and hence the increase in couple as the tip rises is negligible. This gives a range of slot widths within a single lateral force image, so that a slot sufficiently narrow to match the aspect ratio of the tip is always available.

One advantage of the second approach is that the topographical image acquired simultaneously contains information on the shape of the AFM tip 210, which is often also an objective in AFM calibration.

It should be noted that a disadvantage of the above approach to AFM lateral force calibration, which it shares with other methods involving mechanical contact with the tip, is that the functionalised surface of the tip 10 may be damaged or modified during the calibration. Therefore calibration is best performed retrospectively, after experimental measurements that may depend on tip functionalisation.

Measuring Lateral Displacement and Velocity

Fabrication of calibration devices 10 according to embodiments of the present invention may be made near the centre of a 10 mm square die, which is simply broken the die in two to expose the calibration device 10 to interferometry edge-on. As an alternative to the methods for measuring the displacement and velocity of the calibration device 10 during the calibration measurements described above, a better approach may be to include imaging means to enable optical access to the edge of the calibration device 10 in situ. For example:

(a) Using a suspended optical prism 300 to address the edge of the calibration device 10 by reflection, as shown in FIG. 7. The 1 mm high prism is attached to a microscope cover-slip using UV-curable optical adhesive. For imaging purposes this works well, indeed the inset image of the 10 µm thick calibration device 10 shown in FIG. 1 was taken using this prism. For white-light interferometry, however, the extra path-length introduced by the prism is a problem for the Michaelson interferometer, and corrective optics are required. Corrective optics for the Zygo objective should allow calibration of lateral force calibration devices via a suspended prism.

Figure 8:
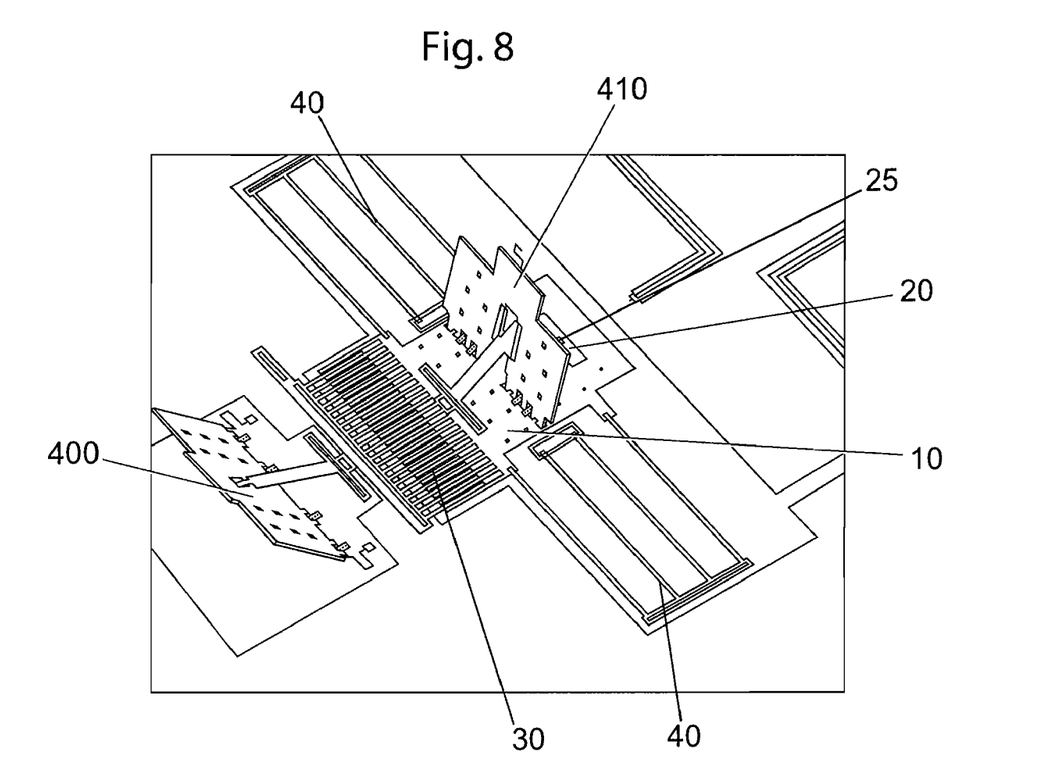
Figure 9:
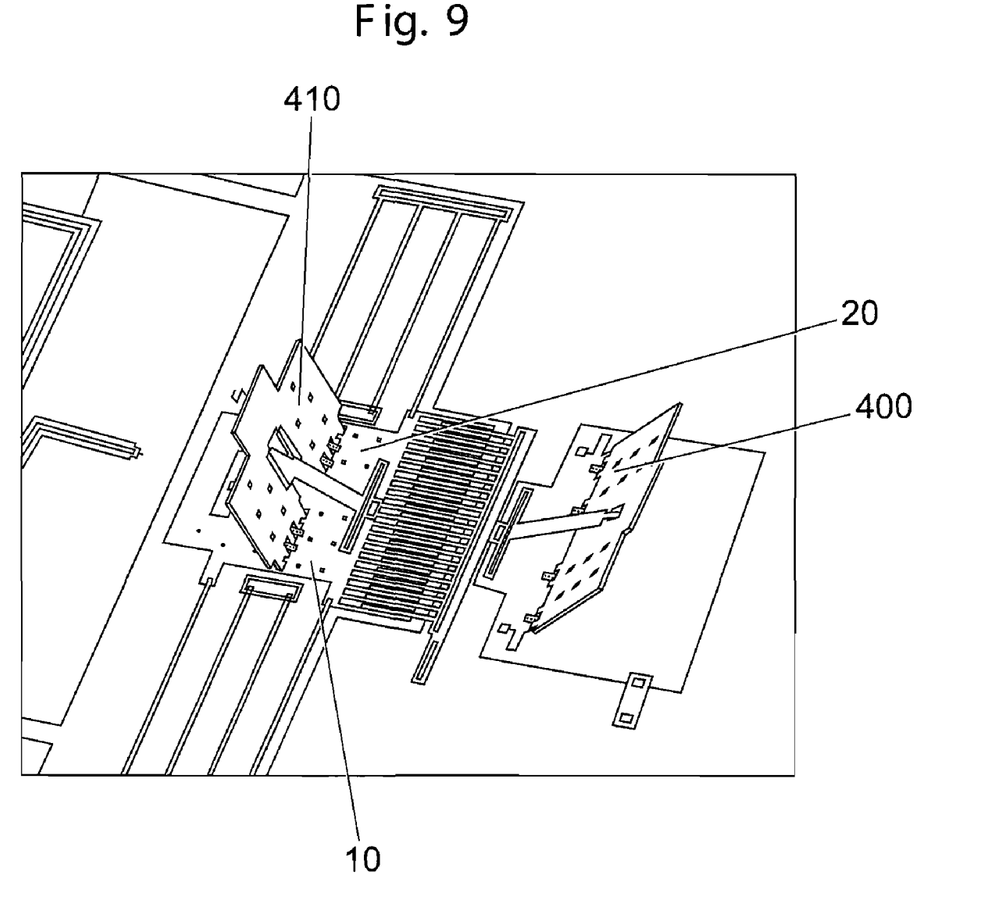
Figure 10:
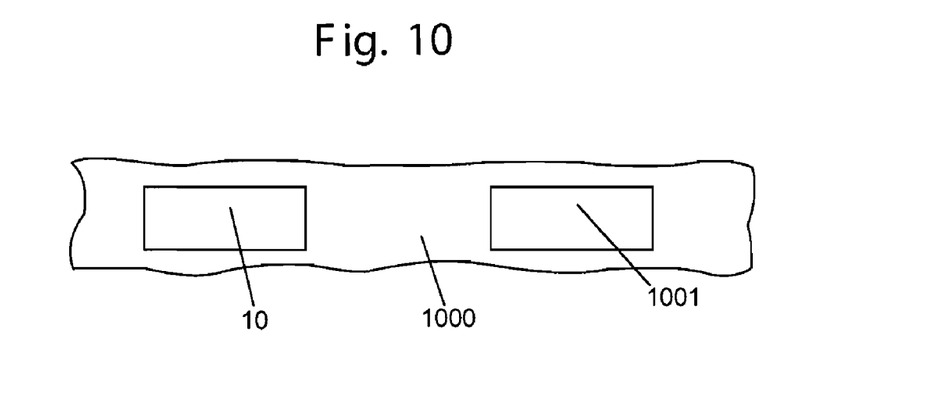
FIG. 10 is a block diagram showing normal and lateral force calibration devices supported on the same die.

(b) Use of a calibration device 10 fabricated in surface micromachined polycrystalline silicon, shown in FIGS. 8 and 9 This version of the calibration device 10 shares the comb-drive feature of the silicon-on-insulator (SOI) design described earlier, but has two mirrors 400, 410, one (400) fixed and inclined near to 45° to vertical, and a second (410), near vertical mirror attached to the platform 20. Lateral displacement of the calibration device 10 can be measured by interferometry on the vertical mirror 410, using an optical path from above, by reflection from the 45° mirror 400 before and after the vertical one. The mirrors 400, 410 preferably have a highly reflective gold surface, and have microfabricated hinges; initially fabricated flat on the surface and lifted into position using a micromanipulator, or one of the various MEMS techniques for erecting optical component structures. One of the advantages of this surface micromachined polysilicon calibration device is that it can be made using the same process used to fabricate a normal force calibration device, as is described in commonly assigned co-pending patent application Ser. No. PCT/GB200/002134. This should allow the fabrication of both normal 1001, and lateral 10 force calibration devices on the same die 1000, as illustrated in FIG. 10.

The invention claimed is:

1. A calibration system comprising:
   a calibration device comprising:
   a platform having a substantially planar surface, one or more supporting legs arranged to provide sprung resistance to the platform; and
   a capacitive drive means for driving the platform substantially parallel to the substantially planar surface;
   a static measurement system arranged to determine lateral displacement of the platform when driven by a predetermined voltage applied to said capacitive drive means;
   a dynamic measurement system arranged to determine a capacitance gradient of said capacitive drive means;
   wherein the calibration system is arranged to determine a lateral spring constant for said calibration device in dependence on the outputs of the static measurement system and the dynamic measurement system, the calibration device further including a small force measuring device tip catching slot for use in conjunction with said lateral spring constant for lateral calibration of a tip of the small force measuring device.

2. A calibration device according to claim 1, wherein the capacitive drive means includes one or more interdigital comb drive capacitive actuators.

3. A calibration device according to claim 1, wherein the capacitive drive means includes a Watt Balance device.

4. A calibration device according to claim 1, further comprising imaging means for enabling optical access to the calibration device when in use.

5. A calibration device according to claim 4, wherein the imaging means includes an optical prism.

6. A calibration device according to claim 5, wherein the imaging means includes one or more mirrors.

7. A calibration device according to claim 1, wherein the slot includes one or more substantially tapered sides.

8. A calibration device according to claim 1, wherein the calibration device is a micro-electro-mechanical system (MEMS).

9. A calibration device according to claim 8, wherein the calibration device is a silicon-on-insulator micro-machined device.

10. A calibration device according to claim 1 fabricated on a die including one or more other calibration devices.

11. A calibration system as claimed in claim 1, wherein the dynamic measurement system further comprises a velocimeter.

12. A calibration system as claimed in claim 11, wherein the velocimeter is a Doppler velocimeter.

* * * * *